United States Patent [19]
Lecomte

[11] Patent Number: 5,936,952
[45] Date of Patent: Aug. 10, 1999

[54] PROTOCOL ADAPTER EQUIPMENT FOR A TELEPHONE SET, AND A TELEPHONE SET PROVIDED WITH SUCH EQUIPMENT

[75] Inventor: Daniel Lecomte, Paris, France

[73] Assignee: Alcatel Business Systems, Paris, France

[21] Appl. No.: 08/839,027

[22] Filed: Apr. 23, 1997

[30] Foreign Application Priority Data

Apr. 24, 1996 [FR] France .................................. 96 05162

[51] Int. Cl.⁶ .................................................. H04L 12/66
[52] U.S. Cl. ............................................................ 370/352
[58] Field of Search .................................... 370/352, 353, 370/354, 355, 356, 465, 466, 467, 401; 379/93.09, 93.11, 93.12, 93.14, 93.15, 100.12, 100.15; 704/201, 270

[56] References Cited

U.S. PATENT DOCUMENTS

| | | |
|---|---|---|
| 4,996,685 | 2/1991 | Farese et al. |
| 5,303,326 | 4/1994 | Dean et al. ............................. 704/201 |
| 5,598,411 | 1/1997 | Matsukawa ............................. 370/352 |
| 5,729,544 | 3/1998 | Lev et al. ................................ 370/352 |

FOREIGN PATENT DOCUMENTS

| | | |
|---|---|---|
| 0637158 | 2/1995 | European Pat. Off. . |
| 2283154 | 4/1995 | United Kingdom . |

*Primary Examiner*—Chi H. Pham
*Assistant Examiner*—Afsar M Qureshi
*Attorney, Agent, or Firm*—Sughrue, Mion, Zinn, Macpeak & Seas, PLLC

[57] ABSTRACT

Protocol adapter equipment for a telephone set including a processing unit (14) provided with hardware and software means organized to enable the telephone set to operate in compliance with a circuit mode communications protocol via a communications link (3) of a telephone network (4), and a telephone set provided with such equipment. The equipment includes a coupler (18) enabling it to operate in packet mode via the communications link in addition to the coupler (17) enabling it to operate in circuit mode, the two couplers being connected to said communications link via a selective switching member (16) and being governed by the processing unit of the set, which unit is provided, for this purpose, with means including a packet mode protocol manager (20) in addition to a circuit mode protocol manager (19).

8 Claims, 1 Drawing Sheet

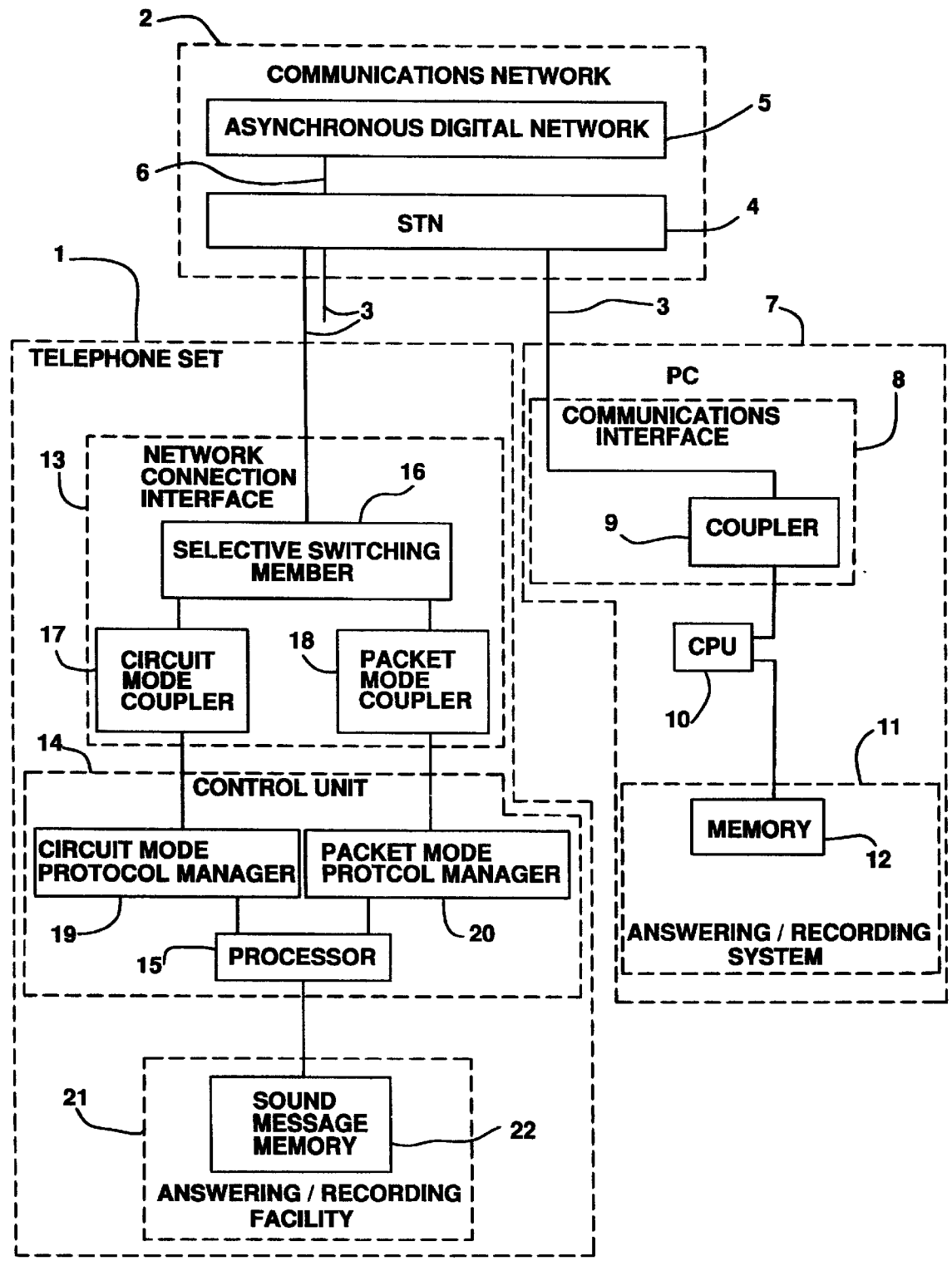

PROTOCOL ADAPTER EQUIPMENT FOR A TELEPHONE SET, AND A TELEPHONE SET PROVIDED WITH SUCH EQUIPMENT

FIELD OF INVENTION

The invention relates to protocol adapter equipment for a telephone set, in particular of the type having an answering machine function, and to a telephone set provided with such equipment which is more particularly designed to make it possible to take into account digitized sound signals conveyed using different protocols, and in particular using a circuit communications protocol and a packet communications protocol, e.g. such as in use on the Internet.

BACKGROUND OF THE INVENTION

It is known that telephone sets are generally designed to be connected to circuit switched telephone networks, commonly designated by the abbreviation "STN", which convey sound and in particular speech in the form of analog signals, or increasingly in the form of digital signals over at least a portion of the path followed by said signals, each call involving setting up a determined circuit for the duration of the call. Usually, the sound signals to be transmitted from a source in digital form are pre-sampled and pre-encoded using a standardized method, usually in the encoding portion of a codec. The samples obtained are transmitted periodically sample-by-sample, when they are conveyed via a digital telephone network, or when the call is of the circuit type.

Furthermore, terminals exist that are designed to communicate data put in digital form and grouped together in packets. Some such terminals can transmit and/or receive data corresponding to digitized sound signals, and such terminals are sometimes organized to be connected to the same links as telephone sets.

Such terminals are in particular personal computers provided with means enabling them to communicate with remote other data terminals and in particular with other computers, such as those of servers, via a link that parents them on a network making it possible to transmit data asynchronously in packets, said link optionally being a telephone link of the analog type, if the computer is provided with means including a modem.

Asynchronous transmission of digital data in packets can be performed entirely via leased links, and is thus liable to be at least locally performed via links of the switched telephone network, which links are governed synchronously.

The codecs used in telephone sets for digitally processing sound signals, in particular those corresponding to speech signals, and the telephone modems used to convert the digital data signals are often connected to the same telephone links. However, such codecs and modems generally do not enable the apparatuses they respectively serve to communicate with one another insofar as the signalling they respectively use and the communications protocols they implement are in practice at least partially exclusive even though they are technically compatible.

More generally, because of the differences existing between communications protocols using circuits and communications protocols using packets, it is generally not possible to cause apparatuses to communicate when one apparatus uses a circuit communications protocol and the other apparatus uses a packet communications protocol.

Furthermore, it is conventional to associate an answering and/or recording machine with a telephone set to enable users of said telephone set to cause a sound message to be transmitted to callers of the set via the telephone line and to record any sound messages transmitted to the set by such callers.

Such an operation is also possible with apparatuses such as computers which are designed to communicate data in packets between them, since digitized sound signals can also be transmitted in this form, as can be the case in particular for computers connected to the Internet.

As a result, the user of a suitably equipped computer can make use of an answering machine and/or sound message recorder function.

Telephone sets using circuit communications protocols and computers using packet communications protocols do not however make it possible for a user having a telephone and a computer, either or both of which have an answering-recording function, to consult the sound messages left by other users in the computer by means of the telephone and/or vice versa.

This can be particularly inconvenient for a person away on a trip who has access to a communications network via an apparatus that enables said person to call the apparatus in which the messages recorded for him or her are located but does not enable genuine communications to take place because of the incompatibilities that exist between the communications protocols implemented by the apparatuses used.

BRIEF SUMMARY OF THE PRESENT INVENTION

The invention thus provides protocol adapter equipment for a telephone set including a processing unit provided with hardware and software means organized to enable the telephone set to operate in compliance with a circuit mode communications protocol via a communications link of a telephone network.

According to a characteristic of the invention, the adapter equipment includes a coupler enabling it to operate in packet mode via the communications link in addition to the coupler enabling it to operate in circuit mode, the two couplers being connected to said communications link via a selective switching member and being governed by the processing unit of the set, which unit is provided, for this purpose, with means including a packet mode protocol manager in addition to a circuit mode protocol manager.

According to another characteristic of the invention, the adapter equipment includes a coupler enabling it to operate in association with an asynchronous digital network of the Internet type, and a corresponding protocol manager.

According to yet another characteristic of the invention, the adapter equipment includes at least one sound message memory incorporated in or separate from the memories of the processing unit of the set that includes the equipment, said memory receiving the sound message data preferably in the same form regardless of the protocol implemented and/or to be implemented for transmitting it.

The invention also provides a telephone set including a processing unit provided with hardware and software means organized to enable the telephone set to operate in compliance with a circuit mode communications protocol via a communications link of a telephone network.

According to a characteristic of the invention, said telephone set is characterized in that it includes equipment having at least one of the above-defined characteristics.

BRIEF DESCRIPTION OF THE DRAWINGS

The FIGURE is a block diagram illustrating a telephone set in a communications environment according to the present invention.

DETAILED DESCRIPTION OF THE INVENTION

The invention, its characteristics, and its advantages appear more clearly from the following description given with reference to the sole FIGURE which is a diagram of a telephone set of the invention in its communications environment.

The telephone set 1 shown in the sole FIGURE is assumed to be connected to a communications network 2 via a telephone link 3 which is, for example, a conventional telephone line of a switched telephone network, if the network 2 is such a network, or a primary access link of an integrated services digital network, if the network 2 is such a network.

In known manner, the communications network 2 is usually suitable for serving a large number of communications links, and in particular links such as the telephone line 3.

In this example, the communications network 2 is assumed to comprise at least one sub-network 4 constituting a telephone network using a circuit communications protocol, a portion of which sub-network is optionally of the synchronous digital network type in which speech signals are conveyed in the form of time-division multiplexed encoded samples, and a sub-network 5 of the asynchronous digital network type using a communications protocol in which the data is conveyed in packets, the data packets being suitable for containing digitized sound signals and in particular speech signals. The sub-networks 4 and 5 and their interconnection represented by a link 6 are not described in any further detail herein insofar as switched telephone networks and asynchronous digital networks, in particular the Internet, are known to a person skilled in the art, and insofar as they are not themselves parts of the present invention.

A personal computer 7 is also shown diagrammatically in FIG. 7. It is assumed to be provided with a communications interface that may be internal or external, and that enables it, for example, to be connected to a telephone line 3 via a coupler 9. For example, the coupler may be of the modem type if the communications link 3 is of the analog telephone line type. Alternatively, it may be of the digital access box or card type if the communications link 3 is an integrated services digital network link. The communications interface 8 is then of the type, widely commercially available, enabling a user of the computer 7 to transmit a telephone-type call number so as to set up a call for data transfer purposes via the coupler 9 with another apparatus connected to the communications network 4 and itself provided with corresponding means for setting up calls. In known manner, such a communications interface usually enables the computer 7 provided with it to be called via the communications link 3 to which the interface is connected for data transfer purposes of the same type as mentioned above. The transfer itself is performed in packets using the chosen packet communications protocol, e.g. the protocol designated by the abbreviation TCP/IP in the case of the Internet in its current form.

In this example, the computer 7 is assumed to include a processing unit 10 organized around at least one processor programmed accordingly, as is known, this not being shown. In the embodiment under consideration, the computer 7 is provided with hardware and software means enabling it to operate as an answering machine and/or a recorder for sound messages, and in particular voice messages, conveyed in the form of data packets via the coupler 9 with which it is provided. The hardware and software means are referenced 11 and they include at least one memory element 12 for the data of the messages to be transmitted and/or to be received, which memory element is, in known manner, located either in the memory (not shown) contained in the processing unit 10, or else in an independent unit.

A user of such a computer is likely to wish to consult the messages sent to the computer for him or her by other people in the form of data packets via the communications link 3 connecting the computer to the communications network 2, while the user is not at the place where the computer 7 is located and does not have a computer available that is capable of performing remote consultation.

Provision is therefore made to modify the telephone sets to enable them to perform such consultations so that a user can consult the sound messages left for him or her by other users on an apparatus provided with an answering and/or recording function both if said function is performed by a telephone at the disposal of said user in a given place, and also if said function is performed by a computer at the disposal of the user optionally also in the same place.

To this end, the telephone set 1 of the invention is provided with adapter equipment including a "network" connection interface 13 via which it can be connected to a communications link 3 giving it access to the communications network 2. Furthermore, like numerous others, this telephone set includes a control unit 14 organized around at least one processor 15 programmed accordingly. This control unit is provided with hardware and software means organized to enable the telephone set to operate usually under a circuit mode communications protocol. It is also provided with hardware and software means organized to enable the telephone set 1 to communicate under a packet mode communications protocol with, for example, a computer.

In the above-mentioned adapter equipment of a telephone set 1, the hardware means associated with a control unit 14 include in particular a selective switching member 16 designed to connect the set to a communications link 3, which member serves firstly a coupler 17 enabling the set to operate in circuit mode and secondly a coupler 18 enabling said set to operate in packet mode.

The coupler 17 which may be physically associated with the selective switching member 16 in the same circuit is of the conventional telephone interface type for a switched telephone network or optionally for an integrated services digital network and it enables a full duplex telephone call to be set up.

The coupler 18 may also be of conventional type. In this example, it is assumed to enable data to be transmitted and received, e.g. over a telephone line via a modem (not shown) after setting up a call with a compatible apparatus, via the communications link 3 and the communications network 2.

As is known, when the coupler 17 is implemented, picking up the handset of the called telephone set or terminal or a corresponding operation on receiving a signal corresponding to a bell ringing results in a full duplex type call being immediately set up between the calling party and the called party. As is also known, when a telephone modem is implemented, the operation corresponding to the handset being picked up on receiving a signal corresponding to a bell ringing results in an audible tone being sent intended to enable the calling party to continue with the interchange of indications that must take place prior to transmitting data to the called party or from said called party.

To perform these various operations, the adapter equipment of a set 1 associates a packet mode protocol manager 20 with the circuit mode protocol manager 19 contained in the processing unit 14 of the set, the managers being respectively assigned to managing the operations that involve selectively either the coupler 18 or the coupler 17.

As is known, these managers are essentially constituted in the form of software, and, in this example, are assumed to be operated by the processor 15 of the processing unit 14.

For example, the packet mode manager 20 may be organized to enable data to be interchanged via the Internet, it being understood that the data is suitable for serving to convey sound signals and in particular speech signals.

When the telephone set 1 is assumed to be capable of operating as an answering machine and/or a recorder, said set is thus provided with a corresponding facility 21 including at least one sound message memory 22 incorporated in or disposed outside the group of memories (not shown) associated with the processor 15. The means enabling the facility 21 to perform the answering and/or recording functions for the telephone set, which means are essentially of the software type apart from the memory 22, are implemented by the processor 15 or optionally by some other processor or at least an auxiliary logic circuit (not shown).

A remote user can thus leave a message in the message memory 22 of the telephone set 1 via the communications link 3 to which the set is connected from another telephone set or terminal (not shown) connected to the sub-network 4 of the communications network, after a call has been set up between the two sets using the circuit mode communications protocol in force for voice communications via a switched telephone network.

A remote user can also leave such a message via the same communications link 3 from a computer connected to the sub-network 5 of the communications network 2, optionally via the sub-network 4. The protocol used to transmit the data corresponding to the sound signals constituting the message to be left is then of the packet type and, for example, of the Internet type, and it follows on from a prior stage during which the telephone set 1 is called, which stage must be performed under the telephone communications protocol in force for transmissions, either via the integrated services digital network, or else via the analog network then requiring a modem to be used at the set.

The messages transmitted and/or received by the telephone set 1 via the telephone coupler 17 and via the coupler 18 do not have the same structure insofar as each message via the telephone coupler is transmitted and/or received in the form of periodically transmitted samples, and each message via the other coupler is transmitted and/or received in one or more packets. Messages can be recorded by the telephone set 1 using one of two different methods depending on the transmission mode (circuit mode or packet mode) chosen, and they are preferably recorded in the same form in the memory 22 provided for receiving sound messages, conversion being performed in the processing unit 14 as a function of needs under the control of the corresponding manager 19 or 20.

This thus enables a user to set up a gateway between modes that authorize said user to enter into communication with a telephone set 1 allocated to said user on a site remote from the site on which said user is located, by means of a computer provided with means enabling the user to enter into communication in packet mode via the telephone line with said set 1 for the purposes of consulting the messages that have been left for the user, regardless of the communications mode (circuit mode or packet mode) used to leave them. This gateway between modes thus enables the user to perform the same operation from a mere telephone set put in communication with the set 1 via the sub-network 4 and the communications link 3. It also enables a user to leave sound messages by means of the telephone network 1 both in another telephone set which is provided internally or externally with an answering and recording function and with which the set 1 communicates in circuit mode, and also in a computer provided with the same function and with which said set 1 communicates in packet mode.

I claim:

1. Protocol adapter equipment for a telephone set comprising:

a processing unit provided with hardware and software organized to enable the telephone set to operate in compliance with a circuit mode communications protocol via a communications link of a telephone network;

a packet mode coupler enabling said protocol adapter equipment to operate in packet mode via the communications link;

a circuit mode coupler enabling said protocol adapter equipment to operate in circuit mode via the communications link; and a selective switching member for connecting said packet mode coupler and said circuit mode coupler to the communications link;

wherein said packet mode coupler and said circuit mode coupler are governed by said processing unit;

wherein said processing unit further comprises a packet mode protocol manager and a circuit mode protocol manager; and wherein sad packet mode coupler communicates data in at least one data packet and said circuit mode coupler communicates at least one of data in periodically transmitted samples or analog signals.

2. The protocol adapter equipment according to claim 1, wherein said packet mode coupler enables said protocol adapter equipment to operate in association with an asynchronous digital network of an Internet type, and said packet mode protocol manager.

3. The protocol adapter equipment according to claim 1, further comprising at least one sound message memory incorporated in or separate from at least one memory of said processing unit, said sound message memory receiving sound message data preferably in a predetermined format regardless of whether the sound message data is transmitted in compliance with the circuit mode communications protocol or a packet mode communications protocol.

4. A telephone set comprising:

a network connection interface for connecting said telephone set to a communications network via a communications link of a telephone network; and a control unit organized to enable said telephone set to operate in compliance with a circuit mode communications protocol via the communications link of the telephone network;

wherein said network connection interface further comprises:

a packet mode coupler enabling said telephone set to operate in packet mode via the communications link;

a circuit mode coupler enabling the telephone set to operate in circuit mode via the communications link; and a selective switching member for connecting said packet mode coupler and said circuit mode coupler to the communications link;

wherein said control unit further comprises:
   a packet mode protocol manager; and
   a circuit mode protocol manager;
wherein said packet mode coupler and said circuit mode coupler are governed by said control unit; and
wherein said packet mode coupler communicates data in at least one data packet and said circuit mode coupler communicates at least one of data in periodically transmitted samples or analog signals.

5. The protocol adapter equipment according to claim 1, wherein said packet mode coupler transmits data in at least one data packet.

6. The protocol adapter equipment according to claim 1, wherein said packet mode coupler receives data in at least one data packet.

7. The protocol adapter equipment according to claim 1, wherein said circuit mode coupler transmits at least one of data in periodically transmitted samples or analog signals.

8. The protocol adapter equipment according to claim 1, wherein said circuit mode coupler receives at least one of data in periodically transmitted samples or analog signals.

* * * * *